(12) United States Patent  (10) Patent No.: US 9,216,353 B2
Haswell  (45) Date of Patent: Dec. 22, 2015

(54) APPARATUS AND METHOD FOR REAL-TIME MEASUREMENT AND EVALUATION OF SKILL LEVELS OF PARTICIPANTS IN A MULTI-MEDIA INTERACTIVE ENVIRONMENT

(71) Applicant: Ignite Game Technologies, Inc., San Francisco, CA (US)

(72) Inventor: Jonathan Haswell, San Francisco, CA (US)

(73) Assignee: Ignite Game Technologies, Inc., Sonoma, CA (US)

( * ) Notice: Subject to any disclaimer, the term of this patent is extended or adjusted under 35 U.S.C. 154(b) by 31 days.

(21) Appl. No.: 13/909,865

(22) Filed: Jun. 4, 2013

(65) Prior Publication Data

US 2014/0274242 A1  Sep. 18, 2014

Related U.S. Application Data

(60) Provisional application No. 61/779,332, filed on Mar. 13, 2013.

(51) Int. Cl.
    *A63F 9/24*      (2006.01)
    *A63F 13/40*     (2014.01)
    *A63F 13/573*    (2014.01)
    *A63F 13/798*    (2014.01)
    *A63F 13/44*     (2014.01)

(52) U.S. Cl.
    CPC .............. *A63F 13/10* (2013.01); *A63F 13/44* (2014.09); *A63F 13/573* (2014.09); *A63F 13/798* (2014.09)

(58) Field of Classification Search
    CPC . A63F 13/10; A63F 2300/64; A63F 2300/61; A63F 13/573; A63F 13/798
    USPC .......................................................... 463/6
    See application file for complete search history.

(56) References Cited

U.S. PATENT DOCUMENTS

| 6,648,760 B1 | 11/2003 | Nicastro |
| 7,090,576 B2 | 8/2006 | Herbrich |
| 7,358,973 B2 | 4/2008 | Herbrich |

(Continued)

OTHER PUBLICATIONS

"Elo Rating System", Wikipedia Website Description. Retrieved online May 21, 2013 at: http://en.wikipedia.org/wiki/Elo_rating_system, May 2013, 18 pages.

(Continued)

*Primary Examiner* — Steve Rowland
(74) *Attorney, Agent, or Firm* — Thomas Schneck

(57) ABSTRACT

Apparatus and methods are described for operating an online interactive simulation/game environment, where an object's motion is controlled by a player along a path. A player's skill level is quickly quantified as they control the object traversing the path, so that they can be properly placed in games with those of like skill, and do so without having competed with others. An optimal path is established for the object's travel during a portion of a game, and at each increment of travel, an optimum velocity or time delta is established. The path of the object being controlled by a player being rated is then tracked over the same path. At each distance increment its position and velocity or time delta are recorded and compared with the optimum. Deviations therebetween are calculated on an incremental basis, and the aggregate determines the player's skill level for a set of equivalent conditions.

20 Claims, 5 Drawing Sheets

(56) References Cited

U.S. PATENT DOCUMENTS

| | | | |
|---|---|---|---|
| 2002/0169013 A1 | 11/2002 | Serizawa | |
| 2002/0183961 A1* | 12/2002 | French et al. | 702/150 |
| 2004/0224741 A1 | 11/2004 | Jen et al. | |
| 2006/0030407 A1 | 2/2006 | Thayer | |
| 2006/0111979 A1 | 5/2006 | Chu | |
| 2007/0066403 A1* | 3/2007 | Conkwright | 463/43 |
| 2007/0156327 A1* | 7/2007 | Tipping et al. | 701/200 |
| 2007/0218980 A1 | 9/2007 | Pachnis et al. | |
| 2011/0212766 A1 | 9/2011 | Bowers | |

OTHER PUBLICATIONS

"Microsoft Research TrueSkill(TM) Ranking System", Microsoft Product Description. Retrieved online on May 21, 2013 at: http://research.microsoft.com/en-us/projects/trueskill/ ;copyright 2013, undated, 2 pages.

* cited by examiner

200 Start

↓ S210

For a given set of conditions, establish an optimal physical path for a player controlled virtual object, and an optimal timing or velocity profile for traversing the path.

↓ S220

Monitor the motion of the virtual object as it traverses the path under player control with respect to timing and position.

↓ S230

At each increment of distance along the path, measure and record a distance deviation of the object's position from the ideal path, and a timing deviation from the ideal timing profile.

↓ S240

Process the distance and timing deviations along the traversal of the path to obtain an aggregate result.

↓ S250

Score the driver's skill for the driven path based on the aggregate result.

↓

End

APPARATUS AND METHOD FOR REAL-TIME MEASUREMENT AND EVALUATION OF SKILL LEVELS OF PARTICIPANTS IN A MULTI-MEDIA INTERACTIVE ENVIRONMENT

CROSS REFERENCE TO RELATED APPLICATIONS

This application claims priority to U.S. provisional patent application Ser. No. 61/779,332, filed Mar. 13, 2013, which application is incorporated herein in its entirety by this reference thereto.

BACKGROUND OF THE INVENTION

1. Technical Field

The invention relates to interactive electronic games and interactive simulation environments where, critically, all data is knowable. More particularly, the invention relates to skill quantification with respect to controlling the path and velocity of an object in an interactive simulation environment.

2. Description of the Background Art

Player skill can be evaluated in games for a number of purposes. For multi-player games, a ranking system is predominately used to both identify and track the skills of gamers in a game in order to better match them into competitive matches.

A common skill ranking and matching system used today for multi-player games is Elo. The Elo rating system is a method for calculating the relative skill levels of players in two-player games such as chess. The Elo rating system is an improved chess rating system, but today it is also used in many other games. Per the Elo rating system, each player has a rating, which is a number. A higher number indicates a better player, based on results against other rated players. The winner of a contest between two players gains a certain number of points in his or her rating and the losing player loses the same amount. The number of points won or lost in a contest depends on the difference in the ratings of the players, so a player will gain more points by beating a higher-rated player than by beating a lower-rated player. Over a series of games, if a player does better than expected, his or her rating will go up.

Another popular skill ranking and matching system is the TrueSkill™ ranking system developed by Microsoft Research. The TrueSkill ranking system only uses the final standings of all teams in a game in order to update the skill estimates, ranks, of all gamers playing in this game. One difference from to other ranking systems is that in the TrueSkill ranking system skill is characterized by two numbers: the average skill of the gamer; and the degree of uncertainty in the gamer's skill. If the uncertainty is high, the ranking system does not yet know exactly the skill of the gamer. In contrast, if the uncertainty is small, the ranking system has a strong belief that the skill of the gamer is close to their rated average skill.

Both the Elo and TrueSkill rating systems, as well as other prior art skill rating systems, assume that the skill of a player in a multi-player competitive game can only be determined as a result of competition. It would be advantageous if a player's skill could be determined without competing against others and determined quickly, especially for games that include online interactive simulation environments such as for instance vehicle racing.

SUMMARY OF THE INVENTION

Apparatus and methods are described for operating an online interactive simulation/game environment, where an object's motion is controlled by a player along a path. A player's skill level is quickly quantified as they control the object traversing the path, so that they can be properly placed in games with those of like skill, and do so without having competed with others. An optimal path is established for the object's travel during a portion of a game, and at each increment of travel, an optimum velocity or time delta is established. The path of the object being controlled by a player being rated is then tracked over the same path. At each distance increment its position and velocity or time delta are recorded and compared with the optimum. Deviations therebetween are calculated on an incremental basis, and the aggregate determines the player's skill level for a set of equivalent conditions.

BRIEF DESCRIPTION OF THE DRAWINGS

FIG. 2 is a flow chart describing how player skill is measured for a player who is controlling a virtual object as it negotiates a path in a virtual environment according to the invention;

DETAILED DESCRIPTION

Figure 1:
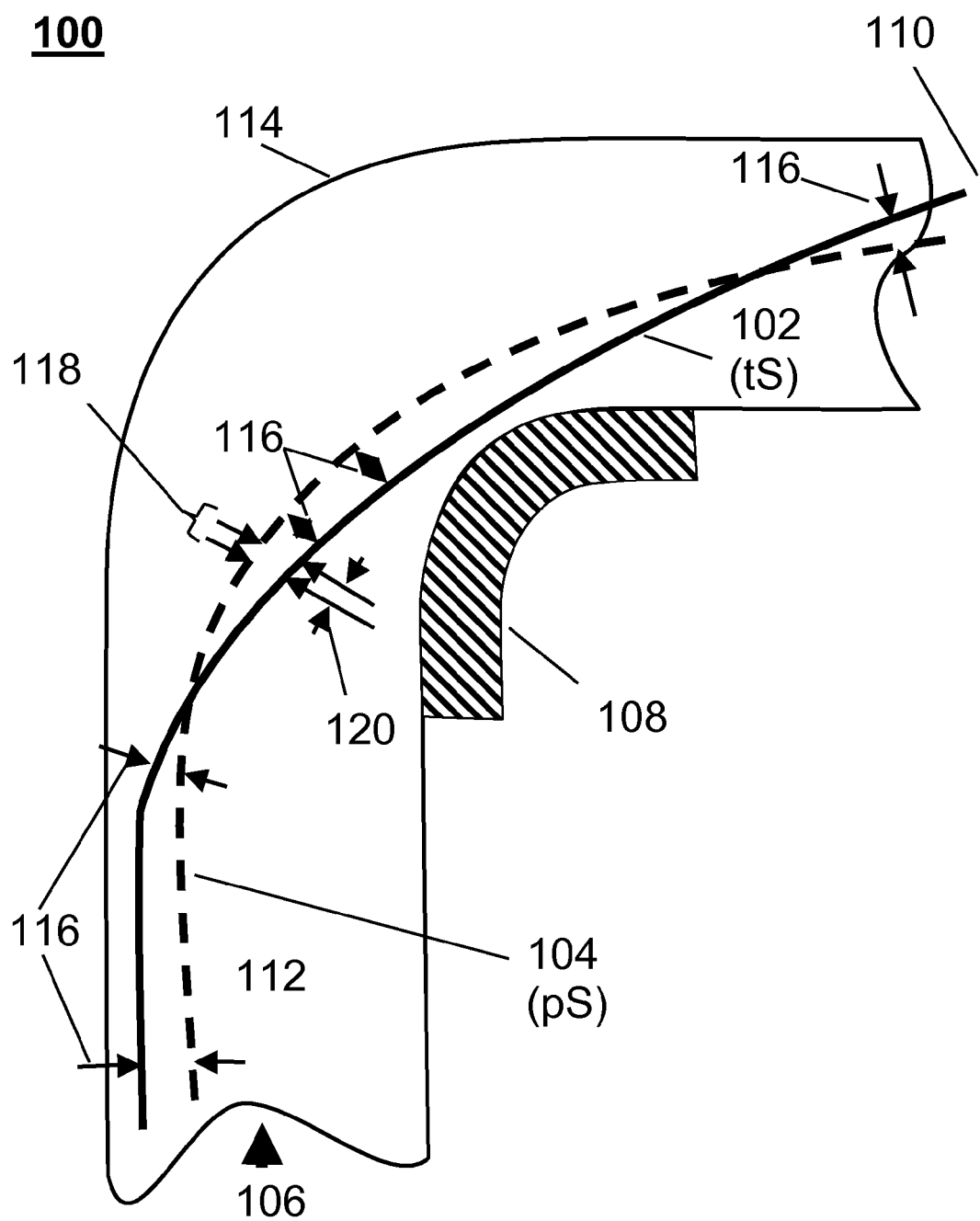
FIG. 1 is a diagram depicting the path of a simulated vehicle as it negotiates a section of simulated race track or course including a straight and a turn, and also including incremental measurements that are made to measure player skill compared with target or optimal skill.

Embodiments of the invention include modular, skill quantification and management engines that may be implemented as part of interactive electronic games and interactive simulation environments. A central principle of embodiments of the invention that differentiates from other skill and ranking systems is that the maximum skill a player can exert over a game is, in fact, knowable. As such, the skill of a specific player can be evaluated and measured against the known maximum level without that player having ever competed head to head with another competitor.

According to embodiments of the invention, player skill may be metered at distance or time increments having any chosen duration, however it is preferred to meter player skill in digital environments at the highest possible fidelity. This degree of unique data visibility facilitates the following functions, in a modular system configuration:

1. Accurate, real-time, player skill quantification;
2. Accurate player skill matching with minimal player history;
3. Optimization of player engagement through real time experience curves;
4. Player liquidity management;
5. Compliance monitoring for both operator and competent authority; and
6. Detection of cheating and fraudulent player behavior patterns, Apparatus and methods are described for operating an online interactive simulation/game environment, where an object's motion is controlled by a player along a path. A player's skill level is quickly quantified as they control the object traversing the path, so that the player can be properly placed in games with those of like skill, even prior to having competed with others. An optimal path is established for the object's travel during a portion of a game, and at each increment of travel, an optimum velocity or time delta is established. The path of the object being controlled by a player being rated is then tracked over the same path. At each distance increment its position and velocity or time delta are recorded and compared with the optimum. Deviations therebetween are calculated on an incremental basis, and the aggregate determines the player's skill level for a set of equivalent conditions.

For simplicity, the embodiments described herein focus on vehicle racing as an exemplary and non-limiting embodiment of the invention. The methods and apparatus described herein are applicable to any interactive simulation environment where a player controls the movements of an object along a path, and where an optimum path and velocity profile can be constructed for a particular set of conditions. The method and apparatus described herein is also applicable to any skill quantification where an individual's skill may be measured with respect to an optimum or target skill level without that player having to compete with other players.

A vehicle may race over a closed-loop or open loop course. For a closed-loop course, each circumvention of the course is referred to as a lap. In one embodiment of the invention, over the course of a lap, for example, a vehicle's path is tracked both on straight sections as well as in turns. It is in turns where a vehicle's optimum path and incremental velocity is most influenced by track conditions. It is also in turns that a player's skill tends to deviate the most compared with an optimal level of skill, although a mistake made in a turn can have a major negative affect on velocity for a straight that follows the turn.

In an embodiment involving vehicle racing the fastest path around a race track is dependent on a number of variables, including but not limited to:

The vehicle type and capabilities;
The track surface condition, e.g. dry, wet, oil covered, debris covered, etc.
One or more instances of passing another vehicle or being passed; and
The entry point for a turn.

The optimal or target path and time/velocity profile for a player controlled object's travel along that path shall be herein called tS, or "Target Skill". In embodiments involving a vehicle racing simulation or game environment, tS includes a target time duration for traversing the path that is the minimum possible under the chosen conditions. However, for some simulation or game environments the duration for traversing the path may not be the minimum possible, but instead may include a specific profile of velocity along an optimal physical path. The path and velocity profile for a player controlled object's travel along a path as guided and influenced by a specific player shall be herein called pS, or "Player Skill".

Knowing Skill

A key premise of embodiments of the invention is that skill is knowable and precisely quantifiable. Methods described herein enable embodiments that support knowing the skill in various types of vehicle performance and racing games, and other genres of games where an object is guided over a path by a player, and where an optimal profile for velocity over that path can be determined.

Players

A player is a participant in a game who is able to influence the outcome of the game. However, the identification of players may not always be obvious. For instance in Simraceway®, an online interactive racing game, pit crews and officials are players in addition to drivers since they can influence the outcome of a match or race. Also, the abstract 3rd party of "chance" is in some cases considered a player as well. For instance, a pit crew's performance can be determined by a real player participating in an event. Alternately, the performance of tasks normally performed by a pit crew can be performed automatically by the game provider by AI or Artificial Intelligence players with variations on that performance being applied according to chance. Just as the best F1 driver occasionally has a "bad pit stop" through no fault of the driver, a chance element can accomplish a similar effect.

Target Skill

Target Skill, hereinafter tS, is the optimal skill that a player can in theory exhibit over the game or simulation at any given point in the game. tS is the element of the gameplay wherein the player can control the outcome by performing as close as possible to this optimal level. For games of material skill (S) and material chance (C), tS is concerned with the player's successful control of S. For games where the element of chance (C) is exerted by the provider, the exercise of a high degree of player skill pS even approaching the tS level will not necessarily derive an outcome in the player's favor, if for instance chance is the predominating factor.

For embodiments involving vehicle racing games or simulations target skill (tS) is the optimal driving line, however a specific target skill (tS) calculation will be different for each game type when the methods described herein are applied to other forms of games or simulations.

Different methods and/or algorithms are available to determine the optimal path of a virtual object on a path, which in some embodiments involving vehicle racing games is the fastest line on a race track. One method is for a computer system running a simulation to drive a "ghost vehicle" around a track taking different lines through turns, braking at different points, and applying throttle at different times exiting a turn, until through a process of successive approximation a convergence is observed on a line and velocity profile that provides the fastest lap for a set of conditions.

Player Skill

Player Skill, hereinafter pS, is the skill exhibited by a player relative to target skill, tS. In embodiments where a player is for example controlling a vehicle, pS is determined based on the vehicle's position relative to the limit line. Where the limit line is the optimal physical path for a given set of conditions. In embodiments, for example, 0 would be perfectly aligned with the optimal path and deviation values above this, measured for example in centimeters, being less well aligned.

FIG. 1 shows track diagram 100 which is a portion of a vehicle racetrack including a straight 112 leading up to a turn or corner 114. In this embodiment, the path representing target skill (tS) 102 is shown as a solid line, and the path representing an exemplary player skill (pS) 104 is shown as a dotted line. A vehicle enters this section of a race track at entry point 106. According to the tS line 102, the fastest path turns-in from the far side of the track and subsequently approaches the inner edge 108 at the apex of the turn. For this example, the inner edge of the turn comprises a shaded area representing a curbing. After passing near the apex of the corner, the tS line drifts to the outside of the track as it reaches the exit 110 of the turn.

The diagram of FIG. 1 shows a number of exemplary locations of deviation 116 where the player controlled physical path (pS) deviates from the optimal tS path. According to exemplary and non-limiting embodiments, physical deviations from the optimal path are calculated at each distance increment upon which skill is monitored. This distance increment could be any physical scale, including for example millimeters, centimeters, meters and kilometers, and may be dependent on the velocity of the object and the length of the path the object travels on. In some embodiments the increment for calculating deviations occurs at regular distance intervals along a path, in other embodiments the resolution for some simulations may be limited to the frame-rate for a video display output. In FIG. 1, two adjacent deviation measurements 118 are shown with an exemplary distance increment 120 separating them.

FIG. 2 shows a diagram 200 describing an embodiment for a process for determining pS relative to tS for a player controlled object traversing a physical path, the physical path being represented in a virtual simulation environment. In step S210, for a given set of conditions an optimal path is established for a player controlled virtual object and an optimal timing or velocity profile is established for traversing that path. The combination of the optimal physical path and optimal timing or velocity profile represents target skill (tS). In step S220, a system according to embodiments of the invention monitors the motion of the virtual object as it traverses the path under player control, and does so with respect to time and position. In step S230, at each increment of distance along the path the system measures and records any distance deviation of the controlled object's position from the ideal path, and any timing deviation from the ideal timing profile. The timing deviation in embodiments is represented as a time delta relative to an optimal time for the controlled object to pass through a specific distance increment along the path. In other embodiments the timing deviation is represented as a velocity relative to an optimal velocity at a specific distance increment along the path.

Subsequently in step S240, each of the distance and timing deviations at all distance increments along the path are aggregated. In step S250, a score rating for the particular player controlling the object along this path is created based on the aggregated result, providing an overall pS value for the player with respect to that path. As a player participates in more games, their pS ratings can be aggregated to determine a pS skill rating that benefits from experience over multiple games.

Assumptions

Embodiments of the invention may use the following assumptions in determining player ratings and rankings:
   The system has perfect information, all material input variables are knowable in a virtual game/race. This is not true in the physical world
   Every object and path combination, such as vehicle and track combination in embodiments involving vehicle racing, has been tested and given a tS limit line or target skill value for each of a set of conditions. If a condition changes, the tS limit line may have changed as well. Handling changed conditions is described below;

Embodiments involving vehicle racing games may use the following assumptions and parameters in determining player ratings and rankings:
   Events for a vehicle racing game can include for example and without limitation the following types:
      Hotlap—single player events in pursuit of fastest lap
      Challenge Races—multi-lap, multiplayer races of <10 laps
      Endurance Challenges—multi-lap, multiplayer races of >10 laps and involving a pit stop;
   Only Endurance Challenges require pitting;
   By default, Pit Crews have equal skill when they are artificially generated. Alternately in embodiments an element of chance can be injected at random by occasionally having some driver's pit stops take longer;
   All cars by default have fixed set ups (suspension adjustment, brake bias adjustment, wing settings, etc.). If any vehicle parameter may be adjusted by a driver, then that parameter becomes a "Player Controllable Input";
   To minimize the need to dynamically adjust tS or choose an alternate tS due to changing track conditions, then by default track or environment condition changes either do not occur or have definable start and end times during an event. This enables their impact on the tS limit line to be more easily quantified. Note that more complex solutions that take changing conditions into account are described later.

In embodiments involving vehicle racing games, a Player (p) may include any of the following:
   Online racers—Human or AI (Artificial Intelligence or simulated racers);
   Pit Crews—Human or AI;
   Actual Chance—Network interruptions, power surges or failures, client or server processing stutters or delays; and
   Simulated Chance—programmed random variables representing the real chance factors exhibited in real motorsport, for example tire blowouts, mechanical failures, 3rd party player accidents.

Event Instance and Game Instance

An event instance is a single complete session of a simulation. In embodiments this will be different for each event type and is defined uniquely for each event. In embodiments involving a vehicle racing game, such as Simraceway, an event instance for example may be a Hotlap Competition, Challenge or Quick Race, where the number of laps will typically be different for each type of event. In Simraceway for example, a Hotlap allows the player to attempt to achieve a single perfect lap, whilst a Challenge event may ask entrants to complete several hundred laps with the added difficulty of each player/racer trying to interfere with each other's line. However, these can both be calculated in the same way by distilling the problem to the lap level and summing the equally weighted variance of the event's constituent laps. For some embodiments described herein for closed-loop vehicle racing events, a "Game" may be thought of as a single lap and while the rating and ranking scores for each constituent lap are then summed to determine the corresponding event's rating and ranking score.

The definitions for game and event instances for some game and event types are obvious for some but not for others. For example in embodiments involving golf a golf game may be viewed not as a round of 18 holes, but rather 18 games of single hole played in an arbitrary sum succession. Alternately, a hole of golf may be viewed as a succession of games where each game comprises a single stroke, with the event still comprising 18 holes. Here, to provide a total pS rating for an event, the individual pS ratings for all strokes may be for example summed over the total of all 18 holes.

Dynamically Adjusting tS for Changing Conditions

In games and simulations a player controlled object often deviates from the optimal path, tS line. In this case a new tS line may be predetermined or calculated based on the objects location. This allows continuous effective judging of the player's skill as they are temporarily off of the original tS line. In embodiments involving a vehicle racing game, a player sometimes finds themselves forced off the normal tS line, their skill can still be judged effectively if tS is temporarily adjusted for that section of the track. This can be accomplished by at least two exemplary and non-limiting methods:

A plurality of alternate tS lines can be predefined before an event or game such that when a vehicle deviates from the optimal line, they are thereafter compared with an alternate tS line at least for that portion of the track.

The tS line for that portion of the track can be dynamically altered in real time according to an algorithm that takes into account the changing conditions. For instance if a vehicle moves off the optimal tS line toward the inside while entering a turn in order to pass a slower car, the algorithm can dynamically adjust tS so that the vehicle's position deviation is essentially zero at that point, and the optimal velocity or time profile is set to be consistent with the driver's velocity as their vehicle pulls even with the vehicle being passed.

Computing pS

In an embodiment, Player Skill (pS) is derived as the distance and time variance from Target Skill (tS) at each distance increment along a path on a single point basis, or in other embodiments on a covered volumetric approach where instead of determining an object's position as a single point, the system according to the invention uses a total 2-dimensional volume of the object in determining the object's position. In embodiments involving vehicle racing games and flying simulations, the latter method is slightly more accurate, particularly where rotation or yaw of an object is concerned.

In embodiments a data point is taken every centimeter. For example in a Simraceway PDC hotlap event, consisting of a 2.3 miles lap, a lap will provide for example in raw form, approximately 370 k data points if a data point is taken every centimeter, 2.3 miles*160,934 cm per mile, for monitoring pS. In embodiments each data point for pS includes a position or distance deviation, typically measured for example in cm, and a timing deviation, which can be implemented as either units of $\Delta$ time, or units of instantaneous $\Delta$ velocity for a particular distance increment along the path, the velocity being compared with the instantaneous velocity corresponding to tS at that point. To compute pS, as shown in FIG. 2, these deviations are recorded as shown in S230 and then aggregated per S240. The aggregation can be performed in embodiments according to a number different methods, for example and not limited to the following:

Distance and timing deviations can be recorded separately at each distance increment, and then a standard deviation can be calculated for each parameter for that distance increment, and the results then aggregated for the entire path.

Distance and timing deviations can be aggregated at each distance increment, and then a standard deviation can be calculated that aggregates the combined deviations over the entire path.

Distance and timing deviations can be recorded separately at each distance increment and then multiplied together for that distance increment. Then a standard deviation can be calculated for the results of the multiplications for each distance increment, and the results then aggregated for the entire path.

Regardless of which method is chosen for aggregation of the deviations, in embodiments it is advantageous to compute the standard deviation for the aggregated deviations. In some embodiments it is advantageous to convert the aggregated deviations to a logarithmic form since there can be for some events a significant range between pS scores of different players. A logarithmic scale enables metering very high fidelity at one end. For example the centimeters/millimeters and 10ths of seconds of leaders and yet also handle new users being a lap behind. Scores below a certain level may be cut off or eliminated since they are essentially too low to be meaningful.

After computing a pS score, it is added to a database, in embodiments the Skillquant database, and then rendered to the user as a percentile specific to a game or event.

Generalized System Configuration

Figure 3:
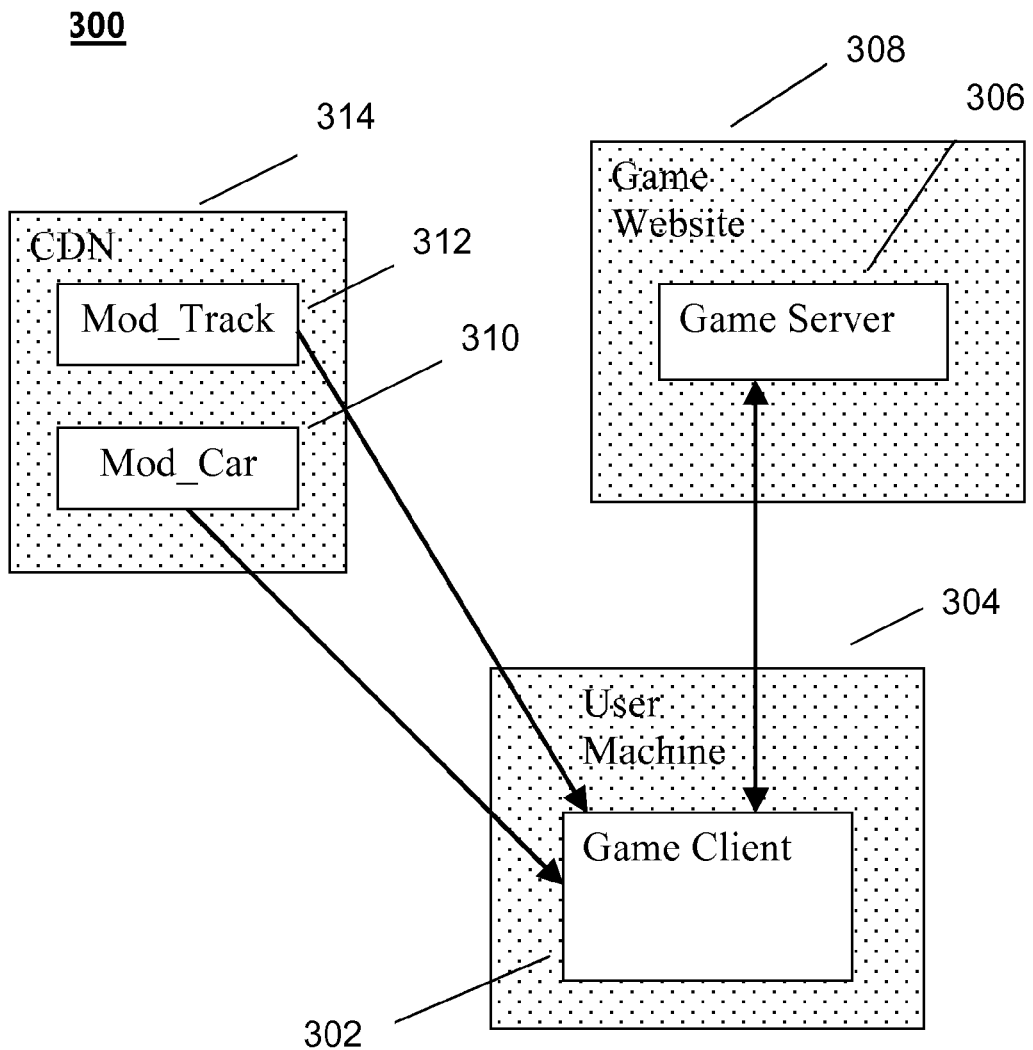
FIG. 3 is a system for implementing the invention.

FIG. 3 includes an overview diagram 300 of an embodiment involving vehicle racing that shows the major components involved in operating a virtual simulation environment or game including virtual models for vehicles 310 and tracks 312 for inclusion in an exemplary vehicle racing game. An optimal tS line and associated timing profiles are with respect to at least a portion of a track 312. Game client 302 resides on a user machine 304 and communicates via a network with a game server 306 located on a host game website 308. In this embodiment the network connecting client 302 and server 306 is the Internet. To install a new model of a vehicle 310 or a track 312, an appropriate compressed file containing the necessary files and directory structure are downloaded from a Content Delivery Network (CDN) 314 or alternatively from the game website 308. Software operating on any of User Machine 304, Game Server 306, or CDN 314 may operate on one or more processors and/or one or more servers, and utilize memory and database resources located thereon. In embodiments, computing and database resources according to the invention may also operate in the cloud. The one or more processors and/or one or more servers may be co-located, spread over different locations, located in the cloud, or a combination thereof. In embodiments, utilizing servers that are part of a cloud computing platform provide a capability to easily expand or contract computing resources required so that a system can quickly and efficiently adapt to client needs and only pay for the computing resources needed at any point in time. A provider of cloud computing resources essentially provides IaaS, Infrastructure as a Service.

Player Controllable Inputs

Each game has its own definition of player controllable inputs, hereinafter PCIs. Some embodiments of the invention described herein evaluates pS for a player in terms of incremental variation of an object or vehicle's path with respect to a position and velocity profile when compared with an optimal tS path, other embodiments for judging player skill involve comparing a player's operation of their game console or controller device, their PCIs, with those of a virtual player operating an equivalent set of PCIs, for an equivalent set of operating conditions. For these embodiments of the invention it is assumed that when a player operates their PCIs in a like manner to a virtual player performing optimal operation of equivalent PCIs and under the same conditions, that their skill level approaches that of a target skill level (tS).

A player's operation of PCIs may be measured in different terms in embodiments, and these terms should be appropriately adapted to a particular game and game controller console. In embodiments for a vehicle racing game, PCIs such as brake and throttle are measured in terms of percentages relative to a maximum brake position and a maximum throttle position, respectively. PCI's such as steering input can also be measured on a percentage basis, or alternately measured on a basis measuring degrees of rotation where 360° represents a full rotation of a rotatable steering input device, and 540° would for instance represent one and a half rotations of a rotatable steering input device. In games and simulations where a joystick is used instead for controlling steering input, a percentage basis is more appropriate. In embodiments where pS is determined and compared with tS on the basis of PCIs, methods implemented at the provider may take into account the relative influence of each PCI. This is critical for a player to be correctly assessed when this embodiment is utilized.

Thus, for embodiments based on PCIs, pS can be alternately calculated whereby pS variance from tS is measured not by the object's variance with respect to a tS comprising a physical path and a timing profile, but instead by the variance on PCIs compared with a tS defined for PCIs. In some embodiments involving vehicle racing games a player may hold a throttle position on a game console, a PCI used to calculate pS, at 72% vs. an optimal tS position of 76%, at a specific increment of time or distance of the path that the controlled object traverses.

Figure 4:
FIG. 4 is a table listing Player Controllable Inputs.
Figure 5:
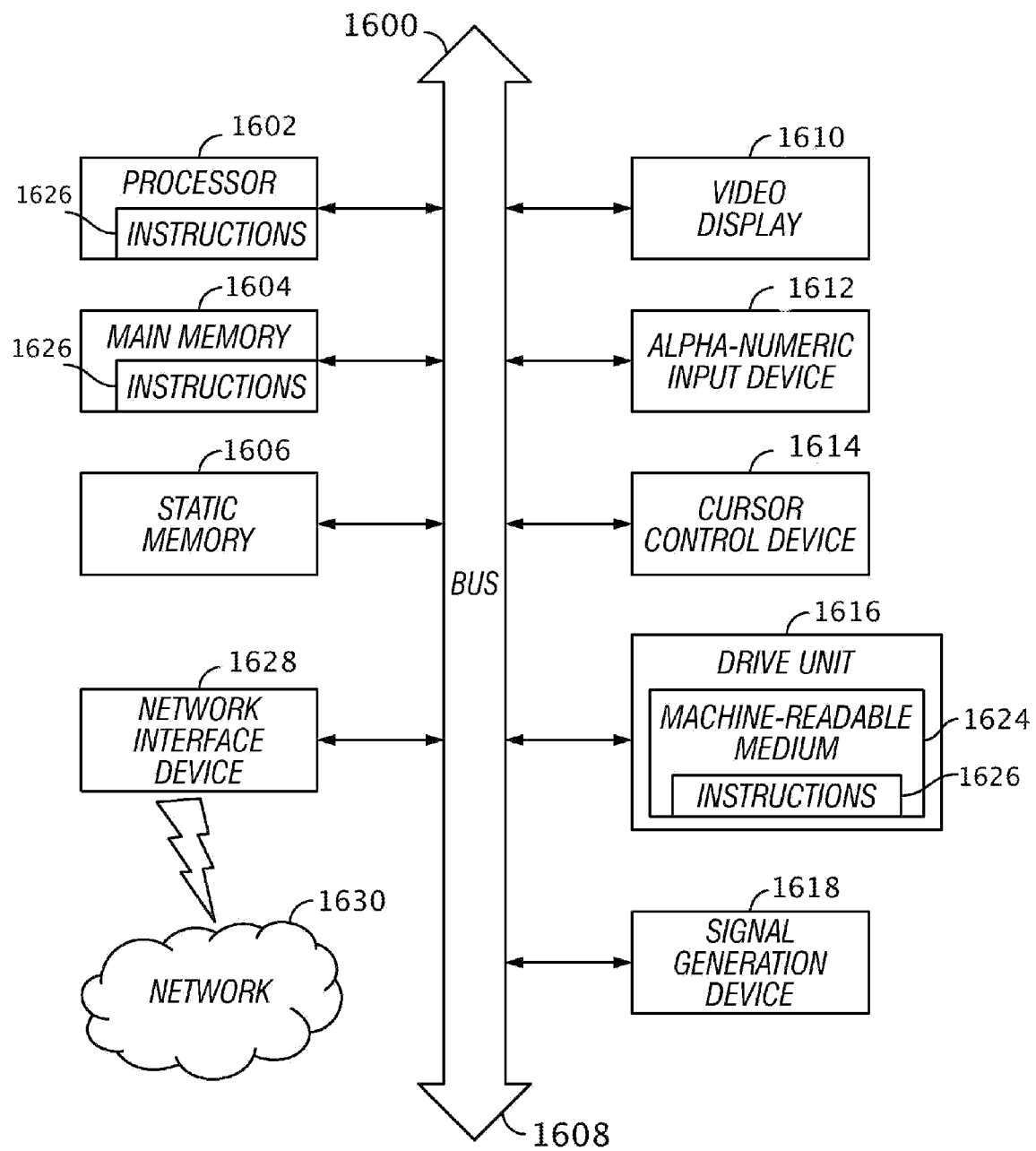
FIG. 5 is a block schematic diagram that depicts a machine in the exemplary form of a computer system within which a set of instructions for causing the machine to perform any of the herein disclosed methodologies may be executed.

Table 400 of FIG. 4 provides an exemplary and non-limiting list of Player Controllable Inputs for embodiments involving vehicle racing games. Note that percentage values are estimates and will vary with driver/player experience level. For example in embodiments, different aides can be offered to "beginners" vs. "intermediates" vs. "experts". Column 402 shows inputs controlled by Beginners and column 404 shows inputs controlled by Intermediate players. For the beginner and intermediate players, a percentage is shown for each input type and represents the % of control an embodiment of a system provides to those broad skill class users. This is sometimes described as "a skills appropriate experience" for the user. Controllable inputs for Advanced players are shown in column 406, and column 408 marked "Simulation" refers simply to a broad label for the top group of Skillquant ranges for ease of reference.

An embodiment with metering at player controlled inputs rather than simply positional output, can require up to eight separate calculations versus just one calculation for embodiments not monitoring player controlled inputs. However, for combining with data taken from real racing events, telemetry data can be easily integrated since it already meters these driver/player inputs. An embodiment with metering at player controlled inputs has applications in professional services for driver development.

Key differences of embodiments monitoring PCIs compared with the embodiments not monitoring PCIs include:
  pS derivation becomes a function of actual Player controllable inputs rather than their output, being the motion of the object/vehicle/car. In embodiments this adds 8 calculation steps.
  tS itself becomes more complex to calculate, which is consistent with a simulation which considers all environmental dynamic variables rather than assuming they are constant. In embodiments this adds 7 calculation steps for the following conditions, including but not limited to: track condition, tire wear, brake fade, fuel load, track temperature and altitude/fuel mix.
  Variance is calculated as both latitudinal and longitudinal from tS on the limit line.

Other Benefits of Measuring Skill

Metering the skill that creates an outcome, for example lap time or position for embodiments involving a vehicle racing simulation, as opposed to simply measuring the outcome has other benefits to both the game provider and the players. Benefits include but are not limited to the following:

Data Insight

The game and game provider get an understanding of the skill behind the outcome, which helps the game and game provider improve skill matching. Improved skill matching directly influences engagement and where monetization is included, improves monetization.

Matching Engine

For asynchronous events, it is useful to utilize pS to match skill among players to:
  Determine, dynamically, the initial skill range of entrants.
  Calculate, according to a user operated ranges, skill cohorts which are groupings of players with like skill according to a desired minimum number of players and according to prize dynamics. The goal being to achieve the tightest range of skill cohort that achieves the required minimum number of entrants after which point a new cohort should be created.
  Admit users to their relevant skill cohort.
  After event entry registration closes, true up above the skill cohorts.
  Identify users who may cross skill cohorts.

Player Liquidity

Player Liquidity represents the pool of players that are available at any one time for any one skill; race class; prize type; location; or any other specific event attribute. For example in embodiments the real time pool of players from which an operator or provider of a simulation or game can reasonably match players against each other. The term "tightly manage" refers to the variance of skill that must be applied to draw enough matches. The more "liquid" the environment, for example the more players online at once and available to play, the tighter matches will be. A dynamic element in the process of skill matching refers to widening and/or narrowing the range of skill variance used by the provider to drive matches according to the prevailing player liquidity. Quantifying a player's skill enables the game and game provider to tightly manage player liquidity via dynamic skill classing.

Other Skill Quantification Methods

Some embodiments discussed thus far are directed to comparing a player's skill level with respect to guiding a vehicle along an optimal path that includes an optimal velocity profile, however other method embodiments for establishing a target skill level and rating a player skill level relative to the target skill level are envisioned. These include for a racing game comparing lap times for a player with an optimal lap time under equivalent conditions and with equivalent equipment. Other method embodiments include evaluating instantaneous acceleration of an object being guided by a player at different points in the game. Skill can also be evaluated such that consistency of performance is included as a component of evaluating a player's skill. Regardless of what methods are used to evaluate a player's skill level, it is also useful to measure the skill progression of a player over time. Based on evaluations of skill progression, benefits arise for both a player and a provider.

Skill Progression and Real Time Experience Curves

Players improve their skills at different rates. Even a player who will eventually have great skill may initially improve slowly. When first placing a player in a multi-player competition, it is critical for encouraging and maintaining player participation that their initial experience is as positive as possible. Therefore, it is advantageous that a player be matched against other players of similar skill, even in their very first competition. Therefore their skill must be known prior to their first competition. Then during the player's first competition they will enjoy a fair and competitive matching with other players, and simultaneously will be re-evaluated on their skill as the game progresses so that they will subsequently be optimally matched for their second, and subsequent competitions.

Continually quantifying a player's skill reveals to the game and game provider a user's likely skill progression through the game, and provides an opportunity to optimize the content and events that can be served to the player. Continually quantifying a player's skill also enables the establishment of Real Time Experience Curves which can be utilized to improve the comfort level of a player by having them feel competitive, and where a game includes any degree of monetization, get a player racing for cash sooner.

This is accomplished for example in embodiments involving vehicle racing by dynamically matching car and race types to:

A player's current skill level

Use a player's experience curve to understand to what level the provider can take the player's skill with a given car/track combination.

In other embodiments dynamic matching of objects and event/game types is done in a similar fashion.

For example, a global skill data set may show that players who have progressed from skill level A to skill level B at rate X will progress to skill point C faster if their next race is with car type A with track type A, and will progress slower if their next race is with Car type B and Track type B.

The following example contrasts the methods of tracking skill described herein with prior art methods based on event outcomes. Assume a first player is running in $9^{th}$ position in a 12 hr endurance race, however eventually places first because position's 1 and 2 caused a pile-up accident on the last lap that took-out themselves and the cars in positions 3-8 closely following. For this scenario, the winning driver is not really the most skilled in that race. They may have been for that last lap, because it may have taken great skill to navigate the pile up, but they may also have just been lucky, which could be determined by comparing their pS line relative to a dynamically-adjusted tS line for the last lap. Therefore the winner's score here would be $9^{th}$ position for the laps preceding the last and then $1^{st}$ for one lap, which isn't the same level of skill as the binary outcome would suggest.

Highlighting Restrained Players

In embodiments a player's skill level is continually quantified in order to enable a game or game provider to highlight players who are very skilled but are restrained by poor physical equipment and or poor virtual equipment. For example in an embodiment involving vehicle racing a player may have chosen a vehicle simulation model that is inferior to others they compete against, such as a car with less power or a car with poor handling. Alternately a player may be using an inferior game control console or input device that provides an additional degree of difficulty that other game consoles or input devices may not impose.

By tracking the rate of skill progression with a given game console, controller or other input device type, a provider assesses any leaps in skill level that occur as a user upgrades equipment are compared to a global dataset of such data. The results of such a comparison reveals where players are hitting skill ceilings because of their interface equipment. For example, a player may have progressed well with keyboards but have achieved their maximum available skill level with a keyboard and need to upgrade to a joypad or steering wheel input device to increase the skill level they can effectively exert.

Highlighting Sandbagging Players

In embodiments a player's skill is continually quantified to enable a game or game provider to highlight players who are very skilled but are attempting to sandbag, wherein a player intentionally makes mistakes to lower their apparent skill level which eventually enables them to be matched with other players they can easily beat. In embodiments this is achieved by looking for unusual, positive, skill variance within events.

For example, in an embodiment involving a vehicle racing game assume that an event consists of 2 levels, a qualifying level and a race level. Here, qualifying determines which of 3 classes, A to C with C being the lowest, of race a player will enter, where all classes offer the same level of prize. If a user sandbags or artificially lowers their skill level to qualify for class C, but is in fact a Class B or Class A skilled player, the provider can track the skill leap from qualifying to race and trigger a variance flag. The variance flag indicates that having compared this particular player's skill progression to a global data set, it has been determined that no user with their equivalent starting skill level has ever progressed to that degree from one session to another. As a result of the variance flag, the provider may either warn or penalize the player in question, or alternately log the event and wait until a pattern of sandbagging has been established for that player before issuing a warning or penalty.

Increased Richness of Game Data

In embodiments a player's skill is continually quantified to enable a game or game provider to accumulate a richer set of performance data for the player in a game, rather than just scoring the outcome. This provides skill data on a player's intra game performance, not simply a game's binary outcome, thereby providing a richer insight on how the black and white data of results was achieved.

Consistency

In embodiments consistency is a simple and robust constituent of a skill evaluation. However, this test needs to be applied within the correct skill tolerance. For example in embodiments the variance of skill that equals "good" or "highly skilled" may be different for different games. A skill consistency number, supported by a statistically robust data set, can be hard to find. This is particularly the case when trying to make a legal classification for an entire population. For instance, using the "skill tolerance" or "Skill consistency" of PGA Golf Players is not a good proxy for the entire user base of Golf. Similarly, using the "skill tolerance" of F1 drivers is not a good proxy for the entire user base of race car drivers.

If a government wanted to determine whether racing enthusiasts in general should be allowed to play online interactive race car games for cash prizes, it is appropriate to determine what the "predominant" skill range of racing enthusiasts is. This should be tested not at the top level of skill, which is generally where most data lies and so is tempting as a proxy however represents a skill that is not possible for the general populace that would be participating online. It is necessary to determine what the general skill level is as practically operated by the predominant number of players playing the game. Digital environments, with perfect information available, are attractive for this reason.

Skill and Chance Paradox and Legal Classification

Frequently games of every genre, digital or otherwise, have some element of skill and some element of chance. There are some exceptions to this rule.

Where a game requires so much skill that to compete effectively it is practically beyond the reach of a majority of users, then upon testing it behaves as a game of chance for that majority of users. This can be relevant for legal classification purposes where competent authorities are not only concerned with testing the technical position of the game, but also scrutinizing its practical operation, "predominance, predominance test", which is a well known legal test. A good example of this is exemplified by some variants of roulette that can actually be played as a game of skill by a very small number of people able to calculate the landing position of the ball based on its trajectory, but whereas the vast majority cannot.

Another example are Synthetic CDOs, which in a context similar to a racing game would be regulated as a game of chance, not a financial markets instrument. For such scenarios, if a test was applied to these financial markets to determine the degree of gambling involved, the "predominant" number of users would not be correctly determining/predicting their outcome from the engagement, and so would not able to skillfully control the outcome of that "game". Thus, because there is an entry cost of the acquisition of the CDO and a prize which is the profit these would be gambling. For these financial markets, core winners would probably be the market making banks who made the margin on each buy and sell trade, a lot like a casino. Financial products like these evade gambling testing not by successfully passing the test of being a game of skill. Being correctly determined as a game of skill, specifically the thing that gambling is not, would represent the test that truly should determine how they should pass. Financial product definitions simply say that if something is a gambling game, it is not a financial investment product and vice versa.

With regard to compliance monitoring with respect to governmental regulations for online gambling, it is important to be able to rate the components of skill and chance in an online game when players wager on the outcome of a competition. As mentioned above, if the skill level required to compete effectively is extremely high, a competition takes on more characteristics of a game of chance for the average player. By matching players by skill levels and doing so right from the beginning of their participation, the ability to compete effectively based on skill is effective from the beginning and the game may be classified more as a game of skill.

In embodiments, to make a game more interesting and enticing for some players, but still focus predominantly on skill, additional elements of chance may be injected into a competition. For instance in a vehicle racing game, simulated weather conditions may be suddenly changed during an event, or a vehicle may suddenly leak simulated oil on the track creating a locally slippery condition. These sudden chance events may catch some drivers unaware regardless of their skill level. Also, automated pit stops may randomly encounter delays that cost even the best drivers time.

Skill/Chance Compliance Monitoring

Some governmental authorities monitor online games to ensure that they qualify as games of skill, especially when wagers are made on the outcomes. Thus, it is useful to quantify the composition of a game with respect to skill versus chance. In simplest terms, if by exercising their control console a player can control the outcome of a game instance, in this context, their finishing position after a lap or game, and relative position to tS, then this is a game of skill. If they cannot, it is a game of chance. The percentage degree to which they can exert that control is the percentage of skill contained in the game and the inverse value is the percentage of chance.

While the foregoing written description of the embodiments enables one of ordinary skill to make a system and practice a method of quantifying player skill with respect to controlling the motion of a virtual object along a virtual path as described, those of ordinary skill will understand and appreciate the existence of variations, combinations, and equivalents of the specific embodiments, methods, and examples herein. The specification described here should therefore not be limited by the above described embodiment, method, and examples, but by all embodiments and methods within the scope and spirit of the embodiment as claimed.

Computer Implementation

FIG. 6 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for quantifying player skill with respect to controlling the motion of a virtual object along a virtual path, comprising:

monitoring with a processor the motion of a virtual object as it traverses a virtual path under control of a player;

recording with a processor distance deviations of the virtual object from an optimum virtual path along the virtual path at at least two distance increments along the virtual path;

aggregating with a processor the distance deviations to produce an overall skill score for the player with respect to the virtual path; and presenting in a display said overall skill score;

wherein the virtual object is a virtual racing vehicle, and the virtual path is at least a portion of a virtual race course or track;

wherein when track conditions along a portion of the optimum virtual path not yet traversed change, an alternate optimum path is used in determining subsequent distance deviations;

wherein changes in track conditions are caused by a non-chance event comprising any of:
a consistent wet track condition;
passing another vehicle; and
being passed by another vehicle.

2. The method of claim 1, wherein the step of recording distance deviation further comprises recording with a processor timing deviations from an optimal timing profile for traversing the virtual path at at least two distance increments along the virtual path; and wherein producing an overall skill score further comprises aggregating with a processor the timing deviations.

3. The method of claim 2, wherein the timing deviations comprise any of velocity deviations and deviations in delta time measurements relative to a previous timing increment.

4. The method of claim 1, wherein alternate optimum virtual paths are predetermined based on possible changes in track conditions.

5. The method of claim 1, wherein alternate optimum virtual paths are recalculated with a processor in real time based on changes in track conditions.

6. A computer implemented method for quantifying player skill with respect to controlling the motion of a virtual object along a virtual path, comprising:

monitoring with a processor the motion of a virtual object as it traverses a virtual path under control of a player;

recording with a processor distance deviations of the virtual object from an optimum virtual path along the virtual path at at least two distance increments along the virtual path;

aggregating with a processor the distance deviations to produce an overall skill score for the player with respect to the virtual path; and presenting in a display said overall skill score, wherein the virtual object is a virtual racing vehicle, and the virtual path is at least a portion of a virtual race course or track;

wherein when track conditions along a portion of the optimum virtual path not yet traversed change, an alternate optimum path is used in determining subsequent distance deviations; and wherein changes in track conditions are caused by a chance event comprising any of:
a suddenly encountered slippery track condition;
suddenly encountered debris on the track;
a tire deflation or blow-out;
a mechanical failure of the vehicle; and
a vehicle suddenly blocking at least a portion of the virtual path of the virtual vehicle.

7. An apparatus for quantifying player skill with respect to controlling the motion of a virtual object along a virtual path, comprising:

a player controlled virtual object traversing a virtual path;

a processor monitoring the motion of the player controlled virtual object as it traverses the virtual path;

said processor recording distance deviations of the player controlled virtual object from an optimum virtual path along the virtual path at at least two distance increments along the virtual path; and said processor aggregating the distance deviations to produce an overall skill score for the player with respect to the virtual path;

a display linked to said processor, such that said display allows visual presentation of said overall said score;

wherein the virtual object is a virtual racing vehicle, and the virtual path is at least a portion of a virtual race course or track;

wherein said processor determines an alternate optimum virtual path when track conditions along a portion of the optimum virtual path not yet traversed change;

wherein said processor recording distance deviations records distance deviations from the alternate optimum virtual path; and wherein changes in track conditions are caused by a non-chance event, comprising any of:
a consistent wet track condition;
passing another vehicle; and
being passed by another vehicle.

8. The apparatus of claim 7, wherein said processor for recording distance deviation is adapted to record timing deviations from an optimal timing profile for traversing the virtual path at at least two distance increments along the virtual path; and wherein said processor for aggregating the distance deviations is adapted to also aggregate timing deviations for producing an overall skill score for the player with respect to the virtual path.

9. The apparatus of claim 8, wherein the timing deviations comprise any of velocity deviations, and deviations in delta time measurements relative to a previous timing increment.

10. The apparatus of claim 7, further comprising said processor storing predetermined alternate optimum virtual paths based on possible changes in track conditions.

11. The apparatus of claim 7, further comprising said processor calculating alternate optimum virtual paths in real time based on changes in track conditions.

12. An apparatus for quantifying player skill with respect to controlling the motion of a virtual object along a virtual path, comprising:

a player controlled virtual object traversing a virtual path;

a processor monitoring the motion of the player controlled virtual object as it traverses the virtual path;

said processor recording distance deviations of the player controlled virtual object from an optimum virtual path along the virtual path at at least two distance increments along the virtual path;

said processor aggregating the distance deviations to produce an overall skill score for the player with respect to the virtual path; and a display linked to said processor, such that said display allows visual presentation of said overall said score;

wherein the player controlled virtual object is a virtual racing vehicle, and the virtual path is at least a portion of a virtual race course of track;

wherein said processor determines an alternate optimum virtual path when track conditions along a portion of the optimum virtual path not yet traversed changed;

wherein said processor recording distance deviations records distance deviations from the alternate optimum virtual path;

wherein changes in track conditions are caused by a chance event comprising any of:

a suddenly encountered slippery track condition;
suddenly encountered debris on the track;
a tire deflation or blow-out;
a mechanical failure of the vehicle; and
a vehicle suddenly blocking at least a portion of the virtual path of the virtual vehicle.

13. The method of claim 6, wherein the step of recording distance deviation further comprises recording with processor timing deviations from an optimal timing profile for traversing the virtual path at least two distance increments along the virtual path; and wherein producing an overall skill score further comprises aggregating with a processor the timing deviations.

14. The method of claim 13, wherein the timing deviations comprise any of velocity deviations and deviations in delta time measurements relative to a previous time increment.

15. The method of claim 6, wherein alternate optimum virtual paths are predetermined based on possible changes in track conditions.

16. The method of claim 6, wherein the alternate optimum virtual paths are recalculated with a processor in real time based on changes in track conditions.

17. The apparatus of claim 12, wherein the said processor for recording distance deviation is adapted to record timing deviations from an optimal timing profile for traversing the virtual path at least two distance increments along the virtual path; and wherein said processor for aggregating the distance deviations is adapted to also aggregate said timing deviations.

18. The apparatus of claim 17, wherein the timing deviations comprise any of velocity deviations and deviations in delta time measurements relative to a previous time increment.

19. The apparatus of claim 12, wherein said processor is adapted to store predetermined alternate optimum virtual paths based on possible changes in track conditions.

20. The apparatus of claim 12, wherein the processor is adapted to calculate alternate optimum virtual paths in real time based on changes in track conditions.

* * * * *